United States Patent [19]

Levinson et al.

[11] Patent Number: 4,735,480
[45] Date of Patent: Apr. 5, 1988

[54] OPTICAL FIBER CONNECTOR

[75] Inventors: F. Howard Levinson, Redwood City; Richard J. McCrae, Dublin, both of Calif.

[73] Assignee: Raychem Corp., Menlo Park, Calif.

[21] Appl. No.: 799,900

[22] Filed: Nov. 20, 1985

[51] Int. Cl.[4] .................................. G02B 6/38
[52] U.S. Cl. ........................................ 350/96.21
[58] Field of Search ............... 350/96.20, 96.21, 96.22

[56] References Cited

U.S. PATENT DOCUMENTS

| | | | |
|---|---|---|---|
| 4,247,163 | 1/1981 | Lumpp et al. | 350/96.21 |
| 4,396,248 | 8/1983 | Bientz et al. | 350/96.21 |
| 4,404,010 | 9/1983 | Bricheno et al. | 350/96.21 X |
| 4,406,515 | 9/1983 | Roberts | 350/96.21 |
| 4,444,461 | 4/1984 | Wey et al. | 350/96.21 |

Primary Examiner—William L. Sikes
Assistant Examiner—Frank González
Attorney, Agent, or Firm—Dennis E. Kovach

[57] ABSTRACT

A connector for optically connecting first and second optical fiber contacts terminating first and second optical fibers includes a split ring comprising first and second split ring halves disposed around each of the contacts such that an enlarged internal bore of the split ring encloses a flange of the contact so as to allow limited relative longitudinal movement between the contact and the split ring. The split ring allows a nut to be disposed over an end of the contact prior to assembling the split ring about the contact which allows the construction to be reduced in size.

17 Claims, 2 Drawing Sheets

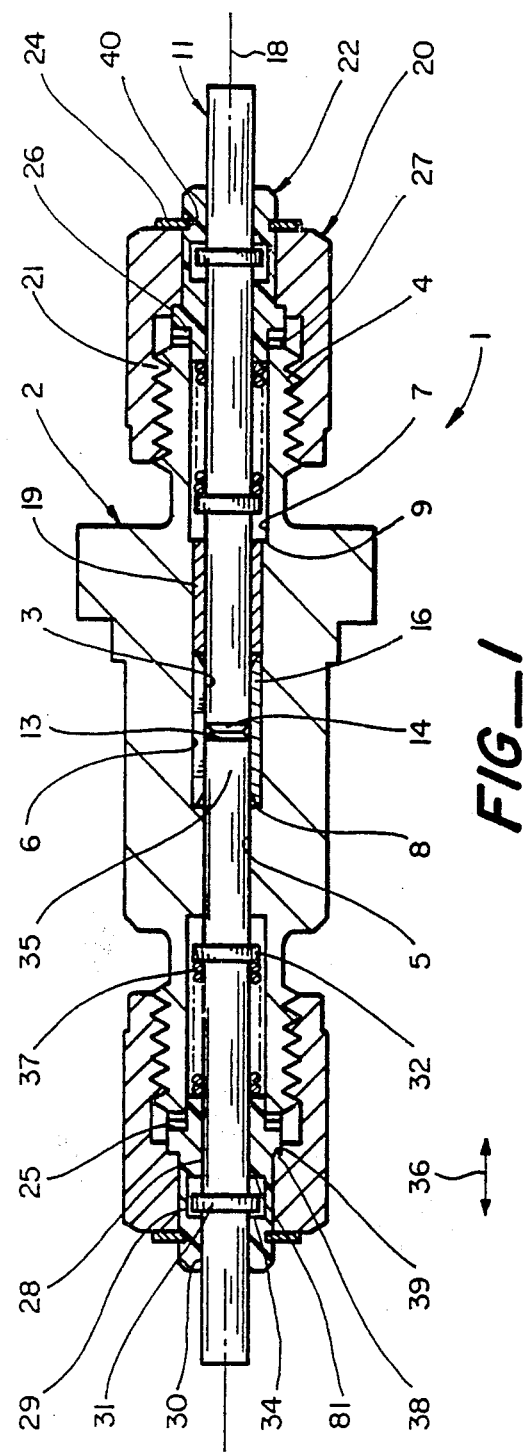
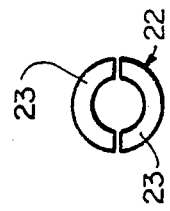
FIG_1
FIG_2

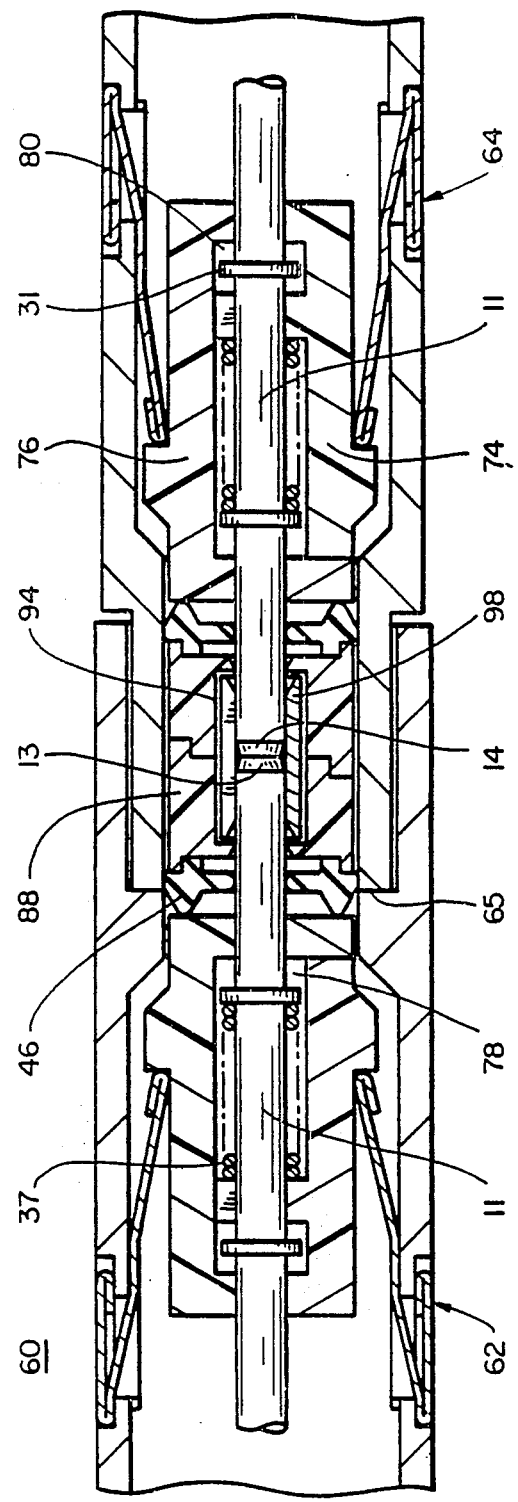
FIG_3

OPTICAL FIBER CONNECTOR

BACKGROUND OF THE INVENTION

The present invention relates to an optical fiber connector for connecting optical fiber contacts.

Numerous methods have been proposed in the prior art for terminating optical fibers to fiber contacts and interconnecting such contacts. In severe environments where relatively wide temperatures ranges can be expected, such as in aerospace, geophysical or industrial applications, fiber optics has not seen extensive use because the cable and connectors are not adapted for these environments. Moreover, the fiber contacts are not designed to be led through conduits.

SUMMARY OF THE INVENTION

Accordingly, it is an object of the invention to eliminate the above-noted drawbacks of prior art optical fiber connectors and to provide an optical fiber connector which is relatively simple in design, small in size, easy to use in the field with small contacts, and which can be used in severe environments.

These and other objects are achieved by an optical fiber connector which includes a receptacle having a step longitudinal bore therein forming first and second adjacent bore regions of different diameters separated by a shoulder, the first bore region being larger in diameter than the second bore region, a circumferentially resilient alignment sleeve disposed within the first bore region, a relaxed inside diameter of the alignment sleeve being less than an outside diameter of the contacts to be mated such that the contacts can be resiliently held and maintained in alignment within the alignment sleeve, and a captivating sleeve disposed within the first bore region adjacent the alignment sleeve, the alignment sleeve abutting against the shoulder and the captivating sleeve, the outer surface of the captivating sleeve being in frictional engagement with an inner surface of the first bore region so as to prevent longitudinal movement of the alignment sleeve. This construction minimizes relative X, Y, Z and angular misalignment between contacts being mated.

In addition, the connector preferably includes a split ring disposed around an outer surface of each contact, each split ring comprising first and second split ring halves assembled around the contact such that an enlarged bore within the split ring surrounds a first contact flange, the contact being moveable longitudinally relative to the split ring over a range defined by a longitudinal length of the enlarged bore, first means disposed around the split ring engageable with a first end of the receptacle so as to maintain the split ring in abutment against the first end of the receptacle when the first means is engaged with the first end, second means disposed around the split ring for preventing movement of the first means relative to the split ring in a rearwardly longitudinal direction, and a spring disposed around the contact adjacent to the split ring, one end of the spring abutting against an end of the split ring with an opposite end of the spring abutting against a second contact flange.

BRIEF DESCRIPTION OF THE DRAWINGS

FIG. 1 is a cross-sectional view of a single channel connector for connecting first and second optical fiber contacts together;

FIG. 2 is an end view of a split ring utilized in the connector of FIG. 1; and

FIG. 3 is a cross-sectional view of a multichannel connector for connecting a plurality of in-line contacts together.

DESCRIPTION OF THE PREFERRED EMBODIMENTS

FIG. 1 illustrates a connector 1 for optically connecting first and second optical fiber contacts 11 together. The connector 1 includes an in-line receptacle 2 having a step longitudinal bore 3 and threads 4 on opposite longitudinal ends of the receptacle, the bore 3 having three discrete sized regions 5, 6, 7 separated by steps or shoulders 8, 9. The bore accepts first and second mating optical fiber contacts 11 in such a manner so as to urge ends 13, 14 thereof into abutment. The bore section 5 preferably has an inside diameter approximately the same as an outside diameter of the optical fiber contact 11 to minimize relative angular movement of the mating ends 13, 14 of the contacts 11. An alignment sleeve 16, preferably split along its longitudinal axis, is disposed within the middle bore region 6 so as to seat against bore step 8, the sleeve 16 preferably having a relaxed inside diameter slightly less than an outside diameter of contacts 11, the sleeve 16 also being resilient such that the sleeve compresses and grips the ends of 13, 14 of the contacts 11 and maintains these ends aligned and in a plane perpendicular to the plane of FIG. 1.

A captivating sleeve 19 is also disposed within the bore region 6 so as to set against the alignment sleeve 16, an outside diameter of the captivating sleeve being essentially equal to or slightly greater than an inside diameter of the bore region 6 so as to press fit within and keep the alignment sleeve 16 in place. The receptacle 2 having the alignment sleeve 16 and captivating sleeve 19 therein is thus suitable for receiving and accurately aligning the ends 13, 14 of the first and second contacts 11 due to the circumferential resiliency of the alignment sleeve 16.

The connector 1 further includes first and second nuts 20 having threads 21 which are adapted to threadably engage with the threads 4 of the receptacle 2. A front face 25 of a split member or ring 22 has anti-rotation teeth 26 formed thereon which extends circumferencially outward from an outer circumferencial surface of the front face 25, the teeth 26 being insertable into corresponding teeth slots 27 extending longitudinally inward from opposite ends of the receptacle 2.

Since an outside diameter of the front face 25 of the split ring 22 is slightly less than an inside diameter of the opposite ends of the receptacle, when the teeth 26 and corresponding teeth slots 27 are angularly aligned, the front face 25 can slide within the ends of the receptacle with teeth 26 seating within the teeth slots thus preventing relative rotation between the split ring 22 and the receptacle 2, especially during rotation of the nut 20. Hence, during installation of the connector by threadably engaging the nut 22 with the receptacle 2 via the threads 4 and 21, the contacts 11 and especially the mating ends 13, 14 thereof are not rotated.

A particularly advantageous feature of the invention is the construction of the split ring 22. As illustrated in FIG. 2, the split ring 22 comprises first and second ring halves 23 which together form first, second and third bore regions 28, 29 and 30, with the bore region 29 being enlarged relative to the bore regions 28 and 30. The half rings 23 are simply assembled onto opposite half circumferencial portions of the contact 11 so as to form an entire ring therearound and are held thereon by frictional forces since the spring 37 and the flange 31 are initially in contact with the split ring halves. The bore region 29 encloses a first contact flange 31 of the contact 11. The front region 28 is sufficiently long such that when a step 81 at the back of the front bore region 28 contacts the flange 31, the contact spring 37 engaged with a front of the bore region 28 is maintained in compression in contact with a second contact flange 32. In addition, the contact spring 37 is sufficiently resilient such that a range of movement of the split ring 22 is sufficient to allow a front face 34 of the bore region 30 to contact the first contact flange 31. A length of the bore region 29 is less than a range of movement allowed by the spring 37 so that excessive axial loads are transferred to the split ring and thus to the connector by engagement between the flange 31 and the split ring face 34 or 81.

To assemble the connector 1 so as to engage the ends 13, 14 of first and second contacts 11 which have previously been connected to first and second optical fibers in a manner as described in copending application U.S. Ser. No. 799,898 filed concurrently herewith and assigned to the assignee of the present invention, the disclosure of which is incorporated herein by reference, first the nut 20 is slipped over the front end 35 of the contact and slid down the cable to which it is connected a short distance. Thereafter, the split ring halves 23 are disposed around the contact 11 in a vicinity of the first contact flange 31 such that the flange 31 is disposed within the bore region 29 formed by the assembled split ring 22 and the spring 37 is compressed about the contact 11. Accordingly, the split ring is free to move in the direction of arrows 36 along a range defined by a longitudinal length of the bore region 29 while all the time keeping the spring 37 in compression.

Subsequent to assembling the split ring 22 around the contact 11, the nut 20 is slid forward around the split ring until a nut flange 39 bottoms on a split ring shoulder 38. Thereafter a C-ring 24 is disposed around the split ring 22 in a groove 40 thereof back of the nut thus captivating the nut in place. The contact 11 is now ready to be connected to the receptacle 2 by threading the nut onto the receptacle end. Accordingly, the front end 13 of the contact 11 is inserted into an end of the receptacle 2 and rotated such that the teeth 26 on the outer circumferencial surface of the split ring seat within and engage the teeth slots 27 of the receptacle 2 and then the nut is screw threaded onto the receptacle.

As previously described, angular misalignment of the mating ends 13, 14 is minimized and prevented by the size of the bore region 5, by the captivating sleeve 19, and by the alignment sleeve 16. Since the optical fibers within the contacts 11 are precisely radially positioned within an aperture therein, an excellent connection between the fibers using the contacts 11 and the connector 1 is achieved.

FIG. 3 illustrates an embodiment of the invention adaptable for connecting multiple in-line contacts disposed in a ribbon-like array, the array extending perpendicular to the plane of FIG. 3. An assembly 60 for so connecting the ribbon arrays of contacts includes a receptacle shell 62 which is mateable with a plug shell 64, the shells 62, 64 being retained together by any appropriate means, such as by nuts and bolts interconnecting flanges thereof, the shells 62, 64 bottoming at point 65 to a fixed position.

First and second wafers 74, 76 interconnect such that half slots therein form a plurality of in-line slots 78, each slot 78 forming an axially extending cavity which receives a back end of the individual contacts 11.

The plug shell 64, in addition to containing the wafers 74, 76, having the contacts 11 disposed in the slots 78, further contains an alignment insert 88 having a hole 94 therein into which is received an alignment sleeve 98. Preferably, the alignment sleeve 98 comprises a radial spring in the form of a cylinder that is split axially, a spring contact of each alignment sleeve 98 being chosen so as to allow compression and extension of the contact springs 37 during shock and vibration loads. The alignment sleeve further acts as a damper so as to reduce shock and vibration induced displacements. Dynamic seals 46 provide environmental protection for internal parts of the connector 60. Various additional details of the connector 60 are described in copending application Ser. No. 671,144 filed Nov. 13, 1984, assigned to the assignee of the present invention, the disclosure of which is incorporated herein by reference.

According to the invention, the wafers 74, 76 are formed so as to form a plurality of additional longitudinal slots 80 at rear portions thereof which are adapted to receive the flanges 31 of the contacts 11 as in the embodiment of FIG. 1, a length of the slots 80 being less than a range of movement allowed by the springs 37 such that excessive axial displacements caused by either shock or vibration result in the flange 31 contacting either a front or rear face of the bore 80 thus transferring loads from the contact to the wafers and hence the connector 60. Accordingly, the springs 37 always maintain front faces 13, 14 of the contacts in contact.

Although the invention has been described with reference to particular embodiments thereof, it should be understood that various modifications thereto can be made within the spirit and scope of the invention, and accordingly the invention is to be limited only by the appended claims.

We claim:

1. An apparatus for connecting first and second mating optical fiber contacts, comprising:

a receptacle having a stepped longitudinal bore therein forming first and second adjacent bore regions of different diameter separated by a shoulder, the first bore region being larger in diameter than the second bore region;

a circumferentially resilient alignment sleeve disposed within the first bore region, a relaxed inside diameter of the alignment sleeve being less than an outside diameter of the contacts to be mated such that the contacts can be resiliently held and maintained in alignment within the alignment sleeve;

a captivating sleeve disposed within the first bore region adjacent the alignment sleeve, the alignment sleeve abutting against the shoulder and the captivating sleeve, an outer surface of the captivating sleeve being in frictional engagement with an inner surface of the first bore region so as prevent longitudinal movement of the alignment sleeve, an inside diameter of the second bore region being substantially equal to an outside diameter of one of the contacts to be mated, an inside diameter of the captivating sleeve being substantially equal to an outside diameter of the other contact being mated, mounting nuts for securing the mating contacts, the receptacle having threads at opposite ends thereof for receiving the mounting nuts for securing the mating contacts thereto, the receptacle having first and second longitudinal ends;

an optical fiber contact having first and second flanges extending from an outer circumferential surface thereof, the contact terminating an optical fiber;

a split ring disposed around the outer surface of the contact, the split ring comprising first and second split ring parts assembled around the contact such that an enlarged bore formed by the split ring parts surrounds the first contact flange, the contact being movable longitudinally relative to the split ring over a range defined by a longitudinal length of the enlarged bore;

a first one of the mounting nuts being disposed around the split ring and being engageable with the first end of the receptacle for maintaining the split ring in abutment against the first end of the receptacle when the first mounting nut is engaged with the first end.

2. The apparatus of claim 1, further comprising means disposed around the split ring for preventing movement of the first mounting nut relative to the split ring in a rearwardly longitudinal direction.

3. The apparatus of claim 2, further comprising a spring disposed around the contact adjacent to the split ring, one end of the spring abutting against an end of the split ring with an opposite end of the spring abutting against the second contact flange.

4. The apparatus of claim 3, the preventing means comprising a C-ring disposed around a circumferential groove formed adjacent a back end of the split ring.

5. The apparatus of claim 4, further comprising means formed on contacting surfaces of the split ring and the receptacle for preventing relative rotation therebetween.

6. The apparatus of claim 5, further comprising:

a second optical fiber contact having first and second flanges extending from an outer circumferencial surface thereof, the second optical fiber contact terminating a second optical fiber;

a second split ring disposed around the outer surface of the second contact, the second split ring comprising first and second split ring halves assembled around the second contact such that an enlarged bore within the second ring surrounds the first contact flange of the second contact, the second contact being movable longitudinally relative to the second split ring over a range defined by a longitudinal length of the enlarged bore of the second contact;

a second spring disposed around the second contact adjacent to the second split ring, one end of the second spring abutting against an end of the second split ring with an opposite end of the second spring abutting against the second contact flange of the second contact;

a second one of the mounting nuts being disposed around the second split ring engageable with the second end of the receptacle so as to maintain the second split ring in abutment against the second end of the receptacle when the second mounting nut is engaged with the second receptacle end; and further means disposed around the second split ring for preventing movement of the second mounting nut relative to the second split ring in a rearwardly longitudinal direction relative to a center of the receptacle.

7. A connector for connecting optical fibers, comprising:

an in-line receptacle having first and second opposite longitudinal ends;

an optical fiber contact having first and second flanges extending from an outer circumferencial surface thereof, the contact terminating an optical fiber;

a split ring disposed around the outer surface of the contact, the split ring comprising first and second split ring halves assembled around the contact such that an enlarged bore within the split ring surrounds the first contact flange, the contact being moveable longitudinally relative to the split ring over a range defined by a longitudinal length of the enlarged bore; and first means disposed around the split ring engageable with a first end of the receptacle so as to maintain the split ring in abutment against the first end of the receptacle when the first means is engaged with frist end.

8. The connector of claim 7, the first means comprising a nut having threads which threadably engage the first end of the receptacle, the nut having a shoulder which abuts against a flange formed on an exterior surface of the split ring.

9. The connector of claim 7, further comprising a second means disposed around the split ring for preventing movement of the first means relative to the split ring in a rearwardly longitudinal direction.

10. The connector of claim 9, further comprising a spring disposed around the contact adjacent to the split ring, one end of the spring abutting against an end of the split ring with an opposite end of the spring abutting against the second contact flange.

11. The connector of claim 10, the first means comprising a nut having threads which threadably engage the first end of the receptacle, the nut having a shoulder which abuts against a flange formed on an exterior surface of the split ring.

12. The connector of claim 11, the second means comprising a C-ring disposed in a circumferencial groove formed adjacent a back end of the split ring.

13. The connector of claim 12, further comprising means formed on contacting surfaces of the split ring and the receptacle for preventing relative rotation therebetween.

14. The connector of claim 13, the rotation prevention means comprising teeth and mating teeth slots.

15. The connector of claim 10, further comprising:

a second optical fiber contact having first and second flanges extending from an outer circumferencial surface thereof, the second contact terminating a second optical fiber;

a second split ring disposed around the outer surface of the second contact, the second split ring comprising first and second split ring halves assembled around the second contact such that an enlarged bore within the second split ring surrounds the first contact flange of the second contact, the second contact being moveable longitudinally relative to the second split ring over a range defined by a longitudinal length of the enlarged bore of the second split ring;

a second spring disposed around the second contact adjacent to the second split ring, one end of the second spring abutting against an end of the second split ring with an opposite end of the second spring abutting against the second contact flange of the second contact;

further first means disposed around the second split ring engageable an opposite end of the receptacle so as to maintain the second split ring in abutment against the opposite end of the receptacle when the further first means is engaged with the opposite end of the receptacle; and further second means disposed around the second split ring for preventing movement of the further first means relative to the second split ring in a rearwardly longitudinal direction, the first and second contacts being optically connected such that the optical fibers are optically connected.

16. The connector of claim 7, further comprising a resilient alignment sleeve disposed within the receptacle near a central bore region thereof, the alignment sleeve having a relaxed inside diameter smaller than an outside diameter of the contact to resiliently clamp the contact, a front end of the contact extending within the alignment sleeve and being clamped thereby.

17. The connector of claim 16, further comprising a captivating sleeve disposed within the central bore region adjacent the alignment sleeve, an outside diameter of the captivating sleeve being approximately equal to an inside diameter of the central bore region such that the captivating sleeve is frictionally retained in place and prevents longitudinal movement of the alignment sleeve, the central bore region being stepped to form a narrower bore region adjacent to central bore region and having a shoulder in contact in the alignment sleeve.

* * * * *